Patented Sept. 17, 1946

2,407,823

UNITED STATES PATENT OFFICE 2,407,823

ANTIHEMORRHAGIC ESTERS AND METHODS FOR PRODUCING THE SAME

Louis F. Fieser, Belmont, Mass., assignor to Research Corporation, New York, N. Y., a corporation of New York No Drawing. Application December 23, 1939,
Serial No. 310,855

20 Claims. (Cl. 260—457)

The invention herein described relates to certain new ester derivatives of antihermorrhagic principles having the distinctive property of being readily soluble in water, and to methods of producing these derivatives.

Among these substances, for instance, are the sulfuric and phosphoric acid derivatives of the hydroquinones corresponding to vitamin $K_1$, 2-methyl-1,4-naphthoquinone, and 2,3-dimethyl-1,4-naphthoquinone; the salts of these sulfuric and phosphoric acid derivatives also come within the scope of my invention.

Vitamin $K_1$ the antihemorrhagic factor of alfalfa which can be isolated readily from this source by a process previously described (application 294,318 issued as Pat. No. 2,357,944 on Sept. 12, 1944), has been shown to be identical with 2 - methyl-3-phytyl-1,4-naphthoquinone, a substance easily obtainable by synthesis (application 294,317).

The vitamin is fat-soluble, but it does not dissolve to any appreciable extent in water, and the usual method of administration consists in giving the material by mouth together with sufficient bile salts to insure its absorption by the system. Aqueous dispersions, suitable for the intravenous injection of the material, can be made only by using a large volume of solvent, and no true aqueous solution can be obtained. The same is true of simpler quinones having antihemorrhagic activity, such as the substances described in a previous application (application 282,427 issued as Pat. No. 2,352,528 on June 27, 1944), including 2-methyl-1,4-naphthoquinone and 2,3-dimethyl-1,4-naphthoquinone. In therapeutic practice it is often highly desirable to administer a vitamin K principle in a small volume of a true aqueous solution, and my invention provides a means for accomplishing this objective.

Suitable methods for producing 2-methyl-3-phytyl-1,4-naphthohydroquinone have been described (application 294,318), and the substance will hereafter be referred to as "vitamin $K_1$ hydroquinone" and ascribed the formula I. When this substance is treated in pyridine solution with chlorosulfonic acid it is converted into the

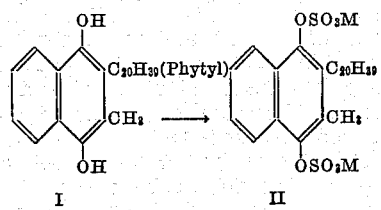

I        II disulfuric acid derivative (II, M=H). By suitable neutralization this derivative can be converted into various salts, such as the crystalline dipotassium salt. In an analogous manner, interaction of I with phosphorus oxychloride affords the diphosphoric acid III (M=H), which can be isolated as such in the form of a nearly colorless

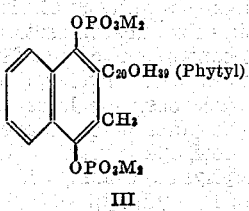

III amorphous solid. The substance dissolves readily in water and is precipitated by the addition of hydrochloric acid, even from a solution of the sodium or potassium salt.

In the same way, 2-methyl-1,4-naphthohydroquinone and 2,3-dimethyl-1,4-naphthohydroquinone can be converted into the corresponding sulfuric acid and phosphoric acid derivatives and their salts; and indeed the process is entirely general and applies to the production of a wide variety of acidic ester derivatives of the reduced forms of quinonoid antihemorrhagic principles.

In contrast to the fat-soluble vitamins $K_1$ and $K_2$ occurring naturally in various foodstuffs, the new derivatives dissolve readily in water, rather than in lipoids, and are entirely suitable for administration in a small volume of an aqueous solution. Furthermore, when assayed by the usual procedure in vitamin K-deficient chicks, many of the new water-soluble substances show marked antihemorrhagic activity and compare in potency with the lipoid-soluble vitamin $K_1$ and with 2-methyl-1,4-naphthoquinone.

Whether the esters are antihemorrhagic as such or undergo hydrolysis and oxidation in the organism cannot as yet be stated, but for practical purposes of medicine the new substances provide the means for a distinct advancement of vitamin K therapy. While vitamin $K_1$ heretofore has been given either by mouth with ox bile to aid in its absorption, or by intravenous injection in a very large volume of a dispersion in glucose solution, the new vitamin $K_1$ hydroquinone diphosphoric acid is suitable for administration in a small volume of water or buffer salt solution. Even when given by mouth, the substance promptly reduces the blood clotting time of K-deficient chicks, and it can be properly described as a "water-soluble form of vitamin $K_1$."

It is noteworthy that the derivative, unlike the natural vitamin, is a solid and not a liquid, that it does not absorb light in the visible region of the spectrum, and that it is more stable both as such and in solution than the vitamin and can be stored more successfully.

Certain other antihemorrhagic substances have been suggested for use in parenteral therapy but the new substances herein described are of a quite different type and possess certain distinct advantages. Almquist and Klose (J. Am. Chem. Soc., 61, 1923 (1939)) suggested the use of phthiocol in the form of the soluble sodium salt, but the substance suffers from being only feebly active as compared with vitamin $K_1$. Doisy, et al. (J. Am. Chem. Soc., 61, 1932, 2563 (1939)) proposed the use of certain naphthohydroquinone and aminonaphthol derivatives in aqueous solutions of their salts, but the extreme sensitivity of these substances to air oxidation imposes a serious limitation on their use. The new esters embodied in the present discovery differ in that they are not subject to such oxidation, the phenolic hydrogens being replaced by acidic residues of adequate stability.

That the biological activity of vitamin $K_1$ and other quinonoid substances in certain cases would be retained on conversion to the sulfuric or phosphoric acid esters of the hydroquinones was not predictable. Thus oestrone loses practically all of its biological potency on conversion to the water-soluble oestrone sulfate (Butenandt and Hofstetter, Z. physiol. Chem., 259, 222 (1939)). Indeed vitamin $K_1$ hydroquinone disulfate shows no activity in the chick assays when administered at a level of 500$\delta$. The diphosphoric acid derivative, however, gives a positive response at 25$\delta$ and therefore does not fall very far short of the potency of the natural vitamin. The nature of the acid radical is thus of importance, but the result may depend as well upon the character of the nuclear part of the molecule.

Particularly potent is sodium 2-methyl-1,4-naphthohydroquinone disulfate, which shows activity when assayed at dosages down to and including 2$\delta$. This substance, furthermore, has given successful clinical results, promptly reducing the prothrombin clotting time when given intravenously, for example, using 10 mg. of salt dissolved in 10 cc. of physiological saline solution, autoclaved at 250° F.

The following procedures illustrate methods suitable for the preparation of a number of water-soluble derivatives of the general nature embodied in my invention and they exemplify a type of reaction and a type of compound which can be extended in many directions. Thus a great many similar water-soluble esters may be produced by the application of the fundamental principle of the interaction of a quinone of the naphthalene or other series, in its reduced form, with the halide of an acid such as sulfuric or phosphoric acid.

The following examples provide a few illustrations of the application of the fundamental discovery.

EXAMPLES (1) *Potassium vitamin $K_1$ hydroquinone disulfate.*—To a mixture of 2 cc. of pyridine and 5 cc. of carbon tetrachloride 0.6 cc. of chlorosulfonic acid is slowly added and the resulting hot suspension containing separated salt is cooled to room temperature and treated with 0.48 g. of vitamin $K_1$ hydroquinone. On manipulating the mixture with a stirring rod and heating to the boiling point for 10 min. the reaction product separates as a viscous mass. After cooling and diluting with ether, the material is obtained as a sticky solid which is collected and washed with ether. The mother liquors and washings afford 0.17 g. of oil which gives no color test with alcoholic alkali (naphthotocopherol?). The collected solid (probably the pyridine salt) is treated slowly while cooling with sufficient 10 N sodium hydroxide to just produce a red color, indicating that an excess of alkali is present. The oily mixture is stirred with a portion of ether to dissolve the pyridine, and the sodium disulfate ester is separated from the liquor by centrifugation and obtained as a dark oil, which becomes waxy on removal of adhering solvent at the water pump. This salt is then stirred, with excess 25% absolute alcoholic potassium hydroxide to effect conversion to the potassium salt. The latter separates in a crystalline condition and after dilution with absolute alcohol the light brown solid is collected and washed. This is purified by crystallization from 95% ethanol, using Norite for clarification, and obtained in the form of colorless plates. The substance gives a clear solution in water. A sample dried at 80° and 18 mm. for 2 hrs. gave the following analysis.

Anal. Calcd. for $C_{31}H_{46}O_8S_2K_2$: C, 54.04; H, 6.73; K, 11.35. Found: C, 54.54; H, 6.71; K, 10.67.

(2) *Sodium 2-methyl-1,4-naphthohydroquinone disulfate.*—A cooled suspension from 1 cc. of pyridine, 10 cc. of carbon tetrachloride and 0.5 cc. of chloro-sulfonic acid is treated with 0.5 g. of 2-methyl-1,4-naphthohydroquinone and the mixture heated for 10 min. on the steam bath, giving a yellow oil. The solvent is decanted after cooling and the oil neutralized with 10% sodium hydroxide, using a slight excess to insure decomposition of any chlorosulfonic acid and liberation of pyridine. The mixture is then extracted thoroughly with ether and the residual red oil taken up in a few cc. of hot water. Alcohol is then added in portions, the first of which precipitates a small amount of inorganic material, which is removed. Further addition of alcohol gives 0.58 g. of tan, crystalline precipitate of the sodium salt, and 0.27 g. more is obtained on evaporating the mother liquor. Crystallization of the crude salt from water gives 0.4 g. of colorless product free from inorganic salts, and this is further purified by dissolving it in water and adding alcohol. The air dried material proved to be a dihydrate.

Anal. Calcd. for $C_{11}H_8O_8S_2Na_2.2H_2O$: C, 31.89; H, 2.92; Na, 11.10; $H_2O$, 8.70. Found: C, 31.82; H, 3.20; Na, 11.21; $H_2O$, 8.29.

(3) *Sodium 2,3-dimethyl-1,4-naphthohydroquinone disulfate.*—The cooled suspension of the addition product from 0.5 cc. of chlorosulfonic acid, 1 cc. of pyridine and 10 cc. of carbon tetrachloride is treated with 0.5 g. of 2,3-dimethyl-1,4-naphthohydroquinone and the mixture heated for 15 min. on the steam bath, giving a pink oil which solidifies on cooling. The solid is collected and washed rapidly, as it is quite hygroscopic, and it is at once treated with a little water and neutralized with 10 N. sodium hydroxide. The residue remaining after digestion with ether is crystallized once from water (0.8 g.) and further purified by dissolving it in water and adding alcohol. The sodium salt is thus obtained as colorless plates. Drying in vacuum at 80° resulted in some darkening, and analyses were conducted on air-dried material, which appears to be the dihydrate.

Anal. Calcd. for $C_{12}H_{10}O_8S_2Na_2 \cdot 2H_2O$: C, 33.64; H, 3.29; Na, 10.74; $H_2O$, 8.41. Found: C, 33.47; H, 3.49; Na, 10.97; $H_2O$, 9.00.

(4) *Sodium 2-methyl-1,4-naphthohydroquinone diphosphate (normal tetra-sodium salt).*—A solution of 0.3 g. of 2-methyl-1,4-naphthohydroquinone in 0.8 cc. of pyridine is added by drops with ice cooling to a suspension prepared by adding 0.5 cc. of phosphorus oxychloride with ice cooling to 1 cc. of pyridine. At the end the mixture is removed from the ice bath and allowed to warm up until the exothermic reaction is over. The white suspension is then treated with 6 cc. of water, added cautiously at first with ice cooling and later heating to dissolve the product. Solid sodium carbonate is added until alkaline to litmus and the pyridine layer which separates is removed and discarded. The solution of sodium salts is stirred with an equal volume of absolute alcohol and the solvent decanted, leaving an aqueous solution of greatly diminished volume. The remainder of the water can be removed by stirring either with fresh portions of absolute alcohol or with two small portions of pyridine, the dehydrating solvent being decanted from the gummy sodium salt. Inorganic salts can be largely eliminated by dissolving the gum in the least amount of hot water, cooling in ice, centrifuging and decanting from the crystallizate. Alternately, the gum is treated in the cold with methanol and enough water to bring the oily salt into solution; by adjusting the proportions of solvents inorganic salts are left undissolved and are removed by filtration. For crystallization of the product such a methanol-water filtrate is concentrated and cooled, oily salt is brought into solution with a little water, pyridine is added by drops until the solution becomes cloudy, and on warming on the steam bath the sodium diphosphate separates as an oil which then crystallizes (the salt is less soluble hot than cold). The colorless crystals are collected, washed with methanol, and air dried; yield 0.68 g. The substance is very hydroscopic and liquefies on exposure to moist air. The sample for analysis was dried at 150° and 2 mm.

Anal. Calcd. for $C_{11}H_8O_8P_2Na_4 \cdot 2H_2O$: C, 28.83; H, 2.64. Found: C. 28.36; H, 2.21.

The potassium salt does not crystallize readily; the calcium salt is precipitated from a dilute aqueous solution of the sodium salt in a gelatinous condition.

(5) *Vitamin $K_1$ hydroquinone diphosphoric acid.*—A solution of 0.48 g. of vitamin $K_1$ hydroquinone in 10 cc. of pyridine is cooled to 2° and added to a similarly cooled solution of 1 cc. of phosphorus oxychloride in 5 cc. of pyridine. The temperature rises to about 15° and pyridine hydrochloride crystallizes. The solvent is largely removed in vacuum at a temperature not above 45° and the residue is treated with 10 cc. of water and extracted with ether. The ethereal extract is then shaken with a slight excess of 1 N sodium hydroxide and the alkaline layer is separated and acidified with hydrochloric acid. The diphosphoric acid thereby precipitated is extracted with ether and obtained by complete evaporation of the solvent as a light tan amorphous solid (0.4 g.). The process of purification is repeated, the solid being dissolved in 1 N sodium hydroxide, the solution extracted with ether, separated and acidified. The precipitated material is taken up in ether and the solvent is evaporated, giving a somewhat waxy, nearly colorless solid. The substance forms a gel when treated with just a small amount of water but dissolves to a clear solution when an adequate quantity of water is used. The sample for analysis was dried at 100° and 1 mm.

Anal. Calcd. for $C_{31}H_{50}O_8P_2$: C, 60.76, H, 8.23. Found: C, 60.92; H, 8.20.

These examples are given to illustrate the nature of the invention but not by way of limitation. Obviously many modifications can be made in the nature of the phenolic and the acid halide components and in the proportions of reagents and details of the condensation and isolation procedures without departing from the essential spirit and scope of the disclosures herein presented.

I claim:

1. Process for the production of water soluble ester derivatives of 1,4-naphthohydroquinones which comprises condensing a 1,4-naphthohydroquinone of the general formula

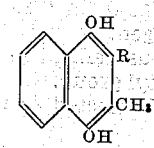

in which R stands for a member of the group consisting of hydrogen and non-cyclic aliphatic hydrocarbon groups, with a halide of a polybasic mineral acid of the group consisting of halogen sulfonic acids and phosphorus oxyhalides in the presence of pyridine.

2. Process as defined in claim 1 in which R stands for hydrogen.

3. Process as defined in claim 1 in which R stands for a phytyl group.

4. Process as defined in claim 1 in which the halide of a polybasic mineral acid is chlorsulfonic acid.

5. Process as defined in claim 1 in which the halide of a polybasic mineral acid is phosphorus oxychloride.

6. A compound of the formula:

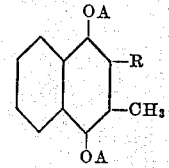

where R is a member of the group consisting of hydrogen and non-cyclic aliphatic hydrocarbon groups, and A is a member of the group consisting of $SO_3H$ and $PO_3H_2$, and alkali metal salts thereof.

7. A compound of the formula:

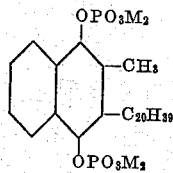

where M is selected from the group consisting of hydrogen and alkali metal.

8. The compound of the formula:

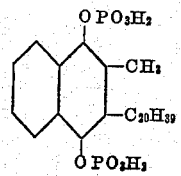

9. A compound of the formula:

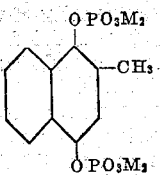

where M is selected from the group consisting of hydrogen and alkali metal.

10. A compound of the formula:

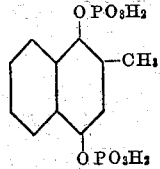

11. Compounds as defined in claim 6 in which R stands for hydrogen.

12. Compounds as defined in claim 6 in which R stands for a phytyl group.

13. A compound selected from the group consisting of the di-sulphate ester of 2-methyl-1,4-naphthohydroquinone, and the water-soluble salts thereof.

14. A compound selected from the group consisting of the di-phosphate ester of 2-methyl-1,4-naphthohydroquinone, and the water-soluble salts thereof.

15. 2-methyl-1,4-dihydroxy naphthalene disulfate.

16. The method of preparing a sulfuric acid ester of 2 - methyl-1,4-naphthohydroquinone which comprises reacting 2-methyl-1,4-naphthohydroquinone with chlorosulfonic acid.

17. The method of preparing a phosphoric acid ester of 2 - methyl - 1,4-naphthohydroquinone which comprises reacting 2-methyl-1,4-naphthohydroquinone with phosphorus oxychloride.

18. A di-phosphate ester of 2-methyl-1,4-naphthohydroquinone.

19. A water-soluble salt of a di-phosphate ester of 2-methyl-1,4-naphthohydroquinone.

20. A water soluble salt of the disulfuric acid ester of 2-methyl-1,4-naphthohydroquinone.

LOUIS F. FIESER.